United States Patent [19]

Nishida

[11] Patent Number: 4,495,607
[45] Date of Patent: Jan. 22, 1985

[54] CIRCUIT DEVICE FOR SELECTING STATION AND TAPE IN TAPE PLAYER WITH BUILT-IN RADIO

[75] Inventor: Katsumi Nishida, Higashi Matsuyama, Japan

[73] Assignee: Beltek Corporation, Japan

[21] Appl. No.: 535,143

[22] Filed: Sep. 23, 1983

Related U.S. Application Data

[63] Continuation of Ser. No. 197,140.

[30] Foreign Application Priority Data

Oct. 27, 1979 [JP] Japan .................................. 54-139031

[51] Int. Cl.$^3$ ....................... H04B 1/20; G11B 31/00; G11B 15/18; G11B 27/12
[52] U.S. Cl. .......................................... 369/6; 360/61; 360/72.2; 360/74.4
[58] Field of Search ................................. 369/2, 6–12, 369/24; 360/137, 61, 72.2, 74.4; 381/123; 179/2 A

[56] References Cited

U.S. PATENT DOCUMENTS 3,400,227 9/1968 Lear ....................................... 369/10
4,205,353 5/1980 Okatani et al. ......................... 369/6
4,241,364 12/1980 Shiga .................................. 360/72.1
4,342,056 7/1982 Ishii et al. ........................... 360/74.4

*Primary Examiner*—Raymond F. Cardillo, Jr.
*Attorney, Agent, or Firm*—McGlew and Tuttle

[57] ABSTRACT

A tape player with a built-in radio for a car, includes a station selection circuit and a tape scanning circuit. A single group of preset switches for selecting a desired station as well as a desired piece of music recorded on the tape is connected to both circuits. A change-over switch is provided for selectively changing over from one of the station selection circuit and tape scanning circuit, to the other. A switching circuit such as a gate circuit, for rendering one circuit inoperative and placing the other in a waiting state for operation in response to the change-over operation of the change-over switch, is also provided, so that manipulation of each preset switch of the group of preset switches, operates either the station selection circuit or the tape scanning circuit, which is kept in the waiting state for operation. The change-over switch is activated by loading a tape, to switch from the station selection circuit to the tape scanning circuit.

4 Claims, 9 Drawing Figures

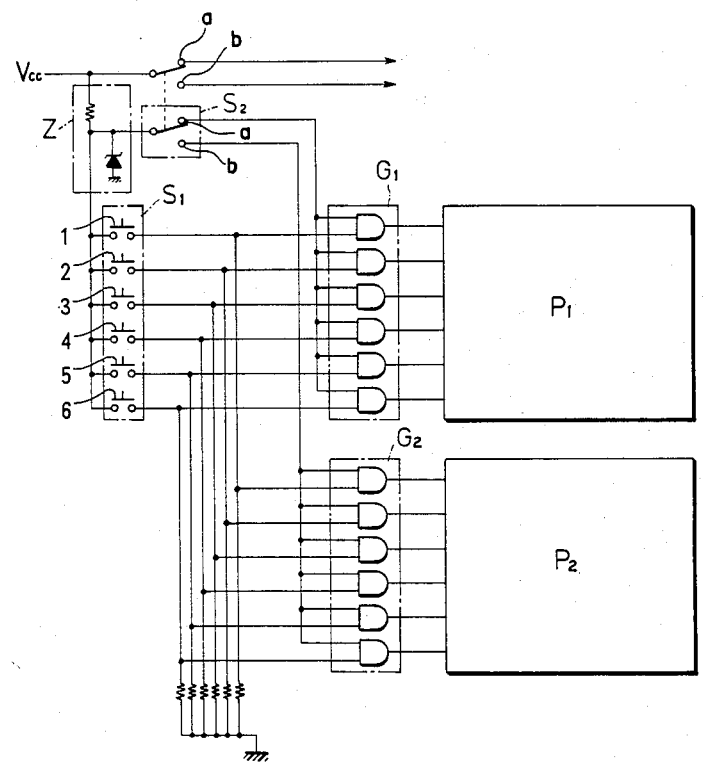
FIG.I(G)

CIRCUIT DEVICE FOR SELECTING STATION AND TAPE IN TAPE PLAYER WITH BUILT-IN RADIO

This is a continuation, of application Ser. No. 197,140 filed Oct. 15, 1980.

FIELD AND BACKGROUND OF THE INVENTION

This invention relates to a circuit device for selecting a desired radio station as well as a desired piece of music or other information, recorded on a tape in a tape player equipped with a radio. A group of preset switches is provided, which function to select the desired radio station as well as the desired piece of music recorded on the tape.

In order to enable an operator of a tape recorder with a built-in radio to automatically perform a so-called "head indexing" operation to find a desired piece of music recorded on a tape, tape selection buttons are necessary in a number corresponding to the number of pieces of music recorded on the tape. Such a tape recorder must also have a tape selection or scan circuit and may include a radio station selection circuit with a radio station selection buttons. A "head indexing-selection circuit" has operation buttons (preset switches) for designating a desired piece of music in a number corresponding to the number of recorded pieces and operates in the following manner: A desired piece is designated by depressing a corresponding button and in accordance with this designation, a rewinding or fast-forward operation of the tape is automatically made. Non-recorded portions on the tape between the pieces of music are then detected so that when the non-recorded portion of the designated piece (or, the head of the piece) is attained, the rewinding or fast-forward operation of the tape is stopped and the tape recorder is placed in the play-back (reproduction) mode.

An automated head indexing as described above, requires a tape selection circuit as well as operation buttons for exclusive use in the circuit, with displays for these buttons. A car tape player with a built-in radio, however, has a radio dial, a cassette loading port and a number of knobs for fast-forward and rewinding of the tape, a volume control knob, a tape eject button, and so forth. All these must be provided on a limited front surface of the player in addition to the buttons for selecting the radio stations. If the above-mentioned tape selection buttons are also to be added, fundamental modification of the circuit and design of the tape player becomes necessary. Moreover, provision of a number of operation buttons and knobs on the front panel would invite an operation error and is not preferred from the viewpoint of player design. If two independent circuit systems, i.e. a station selection circuit (electronic tuner) and a tape selection circuit, are provided in the tape player so as to select a desired station and a desired piece of music on the tape by means of independent operation buttons, the tape player naturally becomes complicated in construction. The possibility for error in making corrections between a number of operation buttons (switches) and these circuits, also increases.

SUMMARY OF THE INVENTION

In the present invention, specific attention is paid to the fact that tape selection, or so-called "tape play", and selection of a desired radio station are not effected simultaneously, and hence, a tape selection circuit and a radio station selection circuit are connected in parallel to a common group of switches so that either one of the above-mentioned two systems is selectively operated by means of operation of the single switch group. According to this arrangement, the present invention simplifies the construction of the operation button mechanism for selecting the station and the piece of music recorded on the tape, and makes it possible to add tape selection buttons to a car tape player without drastically changing its design and construction and without any space requirement in particular. Thus, the present invention provides a circuit device which is most simple and reliable for selecting a desired station as well as a desired piece of music recorded on the tape by means of a preset switch group common to both selection circuits.

For an understanding of the principles of the invention, reference is made to the following description of typical embodiments thereof as illustrated in the accompanying drawings.

DESCRIPTION OF PREFERRED EMBODIMENTS

Figure 1:
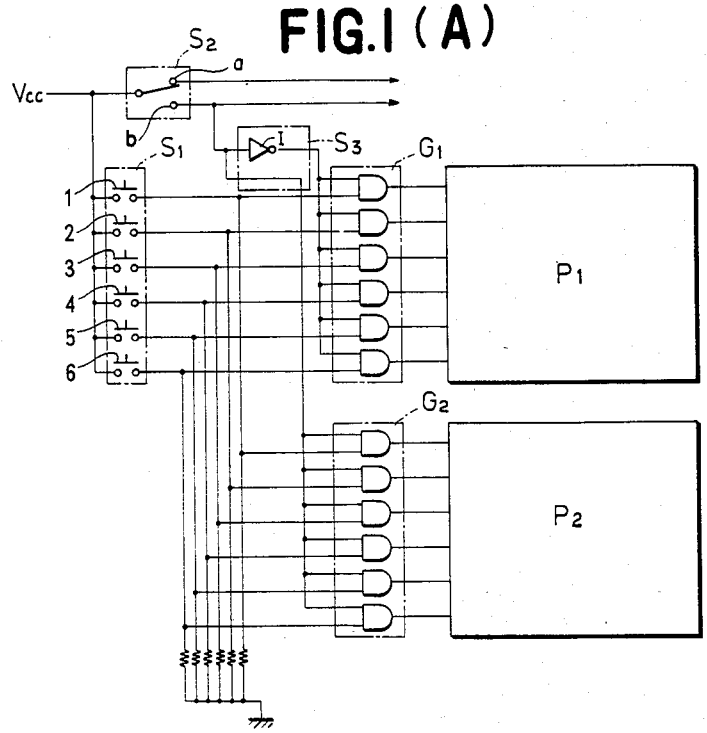
FIGS. 1(A) to 1(G) are circuit diagrams showing examples of a station-tape selection circuit device in a tape player with a built-in radio in accordance with the present invention, including a radio station selection circuit and a tape selection circuit which each can be rendered operative or inoperative.
Figure 1:
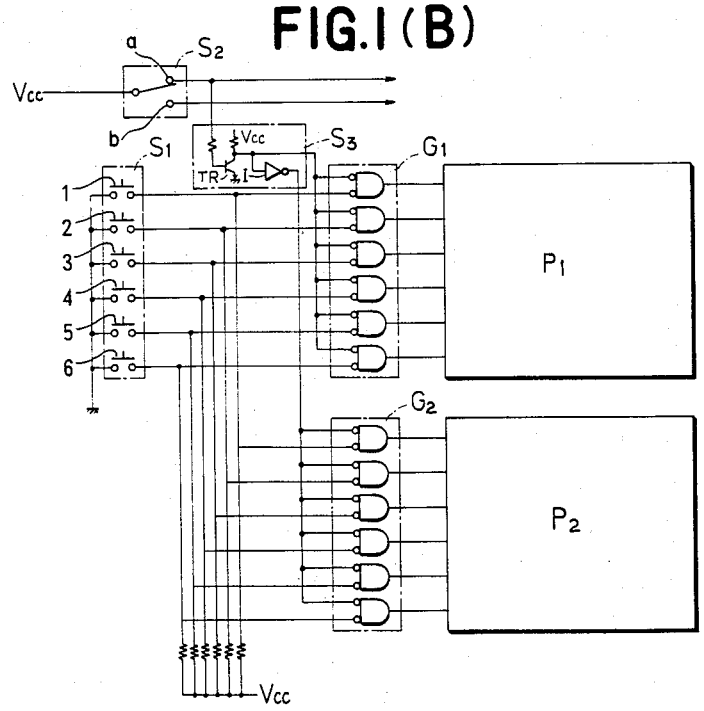

Hereinafter, preferred embodiments of the present invention will be described with reference to the accompanying drawings.

In the drawings, $P_1$ represents a station selection circuit in a tape player with a built-in radio and $P_2$ represents a tape selection or scan circuit. $S_1$ represents a preset switch group which consists of preset switches 1 through 6 in a number corresponding to the number of radio stations or to the number of pieces of music recorded on the tape or to be selected. As illustrated in the circuit diagram, the station selection circuit $P_1$ and the tape selection circuit $P_2$ are connected in parallel with the common preset switch group $S_1$ so as to obtain preset inputs of both circuits $P_1$ and $P_2$ from the individual preset switches of the common preset switch group $S_1$. A station selection circuit tape selection circuit change-over or radio/tape switch $S_2$ is provided, which selectively changes from either one of the selection circuits $P_1$ and $P_2$ to the other and which consists of a contact a on the radio side and a contact b on the tape side.

Gate circuits $G_1$ and $G_2$ are connected to the station selection circuit $P_1$ and to the tape selection circuit $P_2$, respectively, in such a fashion as to keep one of these circuits $P_1$, $P_2$ inoperative and the other in a waiting state for operation in accordance with the change-over switch $S_2$. $S_3$ represents a shift circuit which converts the change-over signal of the switch $S_2$ into an operation signal for the gate circuits $G_1$ and $G_2$. Preferably, the station selection circuit/tape selection circuit changeover switch $S_2$ functions also as a power switch which selectively feeds power to the radio or to the tape player in the interlocking arrangement with a loading or unloading (ejecting) operation of the cassette tape. In other words, the switch opens the gate circuit $G_2$ of the tape selection circuit $P_2$ and closes the gate circuit $G_1$ of the station selection circuit $P_1$ at the time of loading of the tape, thus keeping the tape selection circuit $P_2$ in the waiting state for operation and the station selection circuit $P_1$, inoperative. As a result, when the switch $S_2$ is thus operated, the preset switch group $S_1$ is allowed to function only for the operation of the tape selection circuit $P_2$. When the tape is ejected, the preset switch group $S_1$ is allowed to function only for the operation of the station selection circuit $P_1$. Thus, it becomes possible to allow the common preset switch group $S_1$ to normally function for both station selection and tape selection.

FIGS. 1(A) through 1(G) show respective examples of the operation/non-operation switching circuits of the station selection circuit $P_1$ and the tape selection circuit $P_2$, using the change over switch $S_2$.

In FIG. 1(A), an inverter I is shown used as a level shift circuit $S_3$ and positive AND circuits are used as gate circuits $G_1$ and $G_2$. As shown in the diagram, the inverter I is connected to the tape contact b of the change-over switch $S_2$ and its output is connected to each of the gate circuits $S_1$ on the radio side. Each gate circuit $G_2$ on the tape side, is directly connected to the tape contact b without passing the inverter I. Each member of the gate circuits $G_1$ and $G_2$ is connected to a corresponding preset switch 1 to 6.

It will now be assumed that the change-over switch $S_2$ is set to the tape contact b with a tape loaded. In this instance, a high signal is applied to the inverter I and its low signal output closes the gate $G_1$ on the radio side. If an optional switch of the switches 1 to 6 is depressed, the gate circuit $G_2$ on the tape side is opened by means of the high signal from the tape contact b. As a result, the preset switches 1 to 6 function only for operating the tape selection circuit $P_2$. Gate $G_2$ is in a waiting state, awaiting activation by one of switches 1 to 6. When the change-over switch $S_2$ is changed over from the tape contact b to the radio contact a, the gate circuits $G_1$ and $G_2$ are inversed with each other and change the preset switches 1 to 6 from the tape selection circuit $P_2$ to the station selection circuit $P_1$. The same result could also be obtained by connecting the inverter I between the radio contact a and the tape selection circuit $P_2$.

FIG. 1(B) shows an embodiment which uses a transistor TR and the inverter I to form the level shift circuit $S_3$ and negative AND or NAND gates used as the gate circuits $G_1$ and $G_2$. The base of the transistor TR is connected to the radio contact a via a bias resistor and its collector, which is connected to a power source Vcc, is connected to each gate circuit $G_1$ on the radio side and is also connected to each gate circuit $G_2$ on the tape side, but via the inverter I. If the change-over switch $S_2$ is set to the radio contact a, the transistor TR is turned ON so that the gate circuit $G_1$ on the radio side is open while the gate circuit $G_2$ on the tape side is closed. As a result, each preset switch 1 to 6 functions to select a radio station. If the change-over switch $S_2$ is set to the tape contact b, on the other hand, the transistor TR is turned off so that the gate circuit $G_1$ is closed and at the same time, a low signal is applied to the gate circuit $G_2$ via the inverter I, thereby opening the gate circuit $G_2$. As a result, each preset switch 1 to 6 is changed over to the tape selection circuit $P_2$.

Figure 1C:
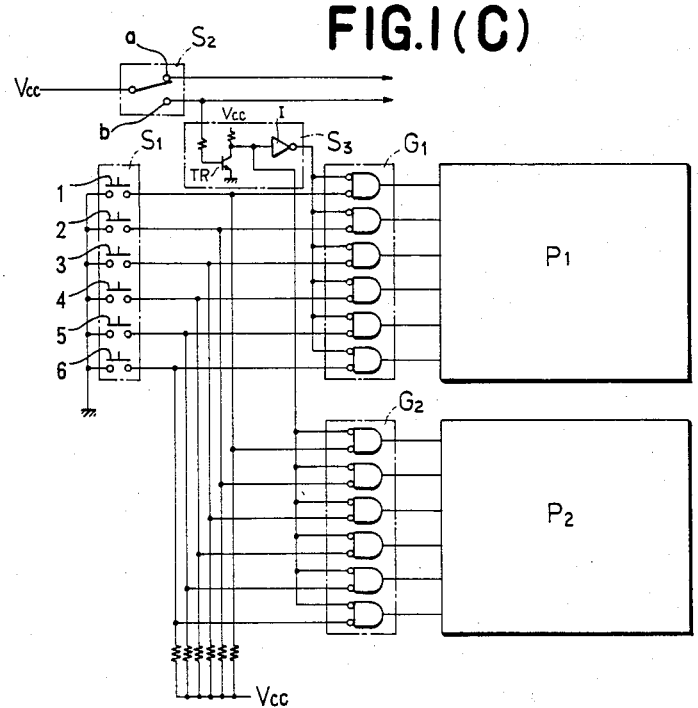

Though the operation is the reverse of the abovementioned embodiment, the same operation can be obtained by connecting the level shift circuit $S_3$ of FIG. 1(B) to the tape contact b of the change-over switch $S_2$ as shown in FIG. 1(C). This is done by inserting the inverter I between the collector of the transistor TR and the gate circuit $G_1$ on the radio side in an opposite manner to the above, and directly connecting the gate circuit $G_2$ on the tape side to the tape contact b.

Figure 1D:
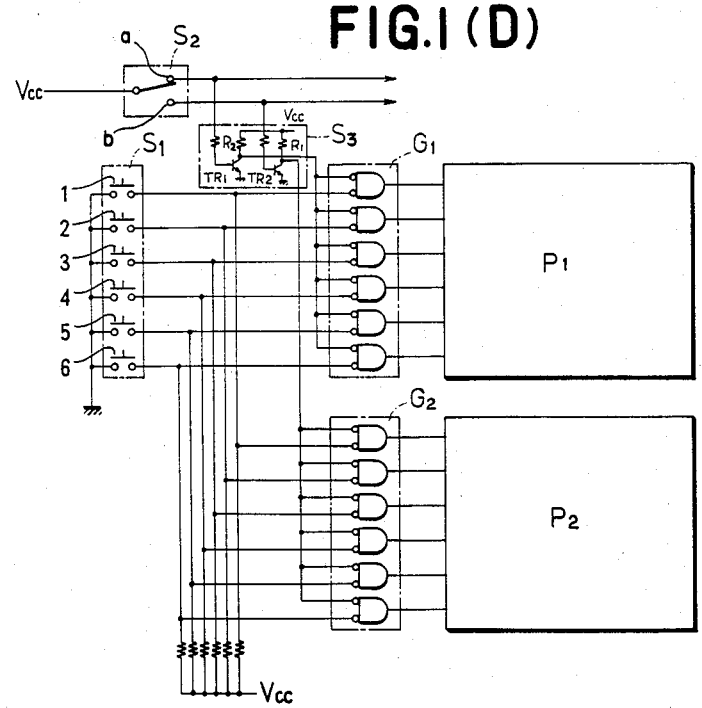

FIG. 1(D) shows an embodiment which uses a transistor $TR_1$ for operating the gate circuit $G_1$ on the radio side and a transistor $TR_2$ for operating the gate circuit $G_2$ on the tape side to form the above-mentioned level shift circuit $S_3$. Negative AND circuits are used as the gate circuits. As shown in the diagram, the base of the transistor $TR_1$ is connected to the radio contact a and its collector is connected to each gate circuit $G_1$ on the radio side. The base of the transistor $TR_2$ is connected to the tape contact b and its collector is connected to each gate circuit $G_2$ on the tape side. The collectors of both transistors $TR_1$ and $TR_2$ are connected to a power source $V_{cc}$ via resistors $R_1$ and $R_2$, respectively.

According to this arrangement, when the change-over switch $S_2$ is set to the radio contact a, for example, the transistor $TR_1$ is turned ON so that the gate circuit $G_1$ on the radio side is opened by means of the low signal output of the transistor $TR_1$ (provided that an optional switch of the preset switches 1 to 6 is turned on). On the other hand, a high signal is applied from the power source $V_{cc}$ via the resistor $R_1$ and in this case, the gate circuit $G_2$ is closed if any of the preset switches 1 to 6 are depressed. As a result, the preset switches 1 to 6 are changed over to the station selection circuit $P_1$ via the gate circuit $G_1$ and function only for station selection. On the contrary, when the change-over switch $S_2$ is set to the tape contact b, the transistor $TR_2$ is turned ON so that the gate circuit $G_2$ on the tape side is opened by means of the low signal output of the transistor $TR_2$ if an optional switch of the preset switches 1 to 6 is turned ON. On the other hand, a high signal is applied to the gate circuit $G_1$ on the radio side from the power source $V_{cc}$ via the resistor $R_2$ and the gate circuit $G_1$ is kept closed even if anyone of the preset switches 1 to 6 is turned ON. Accordingly, the preset switches 1 to 6 function only for operating the tape selection circuit $P_2$.

Figure 1E:
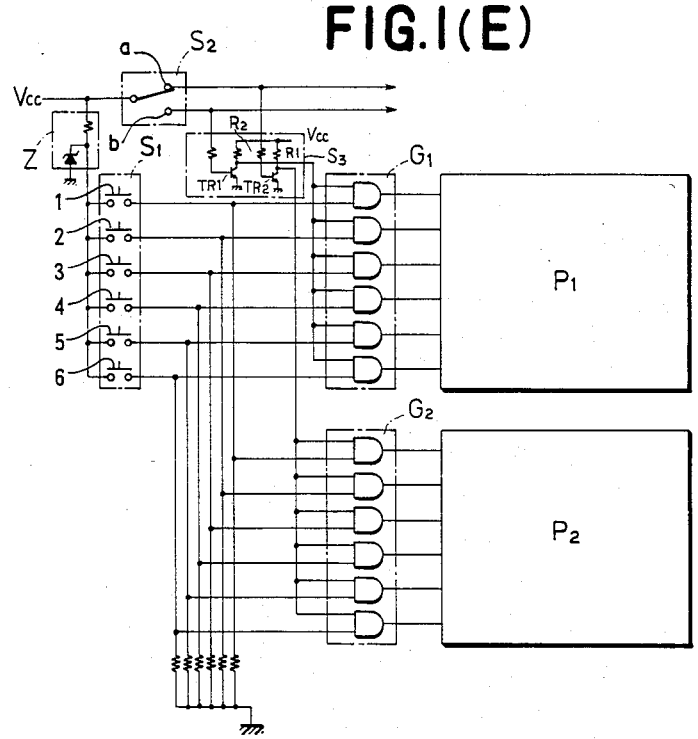
Figure 1F:
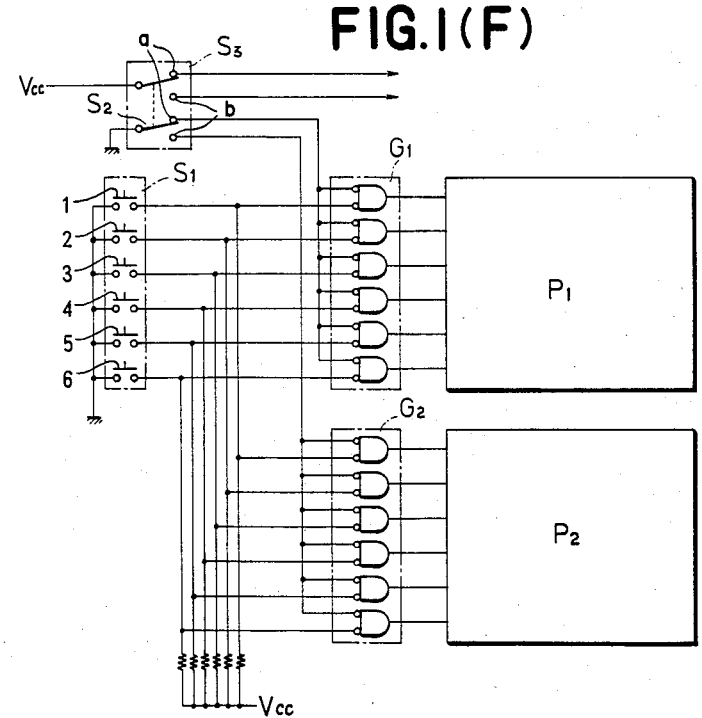

FIG. 1(E) shows an embodiment which uses positive AND gates $G_1$ and $G_2$ in place of the negative AND gates $G_1$ and $G_2$ of the embodiment shown in FIG. 1(D). In this embodiment, the connection of transistors $TR_1$ and $TR_2$ to the radio contact a and to the tape contact b is the reverse of the above-mentioned embodiment and one common side of the preset switches is connected to the power source $V_{cc}$ via a converter Z. This converter Z is used for the level setting of the operating voltages of the gate circuits $G_1$ and $G_2$ via the preset switches.

Though the embodiments shown in FIGS. 1(A) through 1(E) establish change-over between the station selection circuit $P_1$ and the tape selection circuit $P_2$ by means of a single switch, it is preferable that the switch be actuated during an operation for loading of the tape. To this end, the embodiments shown in FIGS. 1(f) and 1(G) use two-way switches $S_3$ and $S_2$, one ($S_3$) being for switching the power source between the radio and the player and the other ($S_2$) being for switching between the station selection circuit and the tape selection circuit. The same operation as the above-described embodiments can be obtained by selectively connecting the change-over switch $S_2$ to the negative AND gates $\overline{G}_1$, $\overline{G}_2$ and the positive AND gates $G_1$, $G_2$, as shown in the drawing.

According to the above-described circuit arrangement, selection of a desired station and a desired tape piece can be made by selectively changing over to the necessary circuit by means of manipulation of the group of preset switches $S_1$ that are common to the tape selection circuit $P_2$ and the station selection circuit $P_1$. Thus, the preset switches can be used conjointly for the selection of the station and the tape piece, and the operation mechanism as well as the circuit configuration can also be simplified. Further, the desired selection between the station and the tape can be made in a reliable manner according to the above-described circuit configuration. It is possible to optionally increase or decrease the number of switches in switch group $S_1$.

Figure 2:
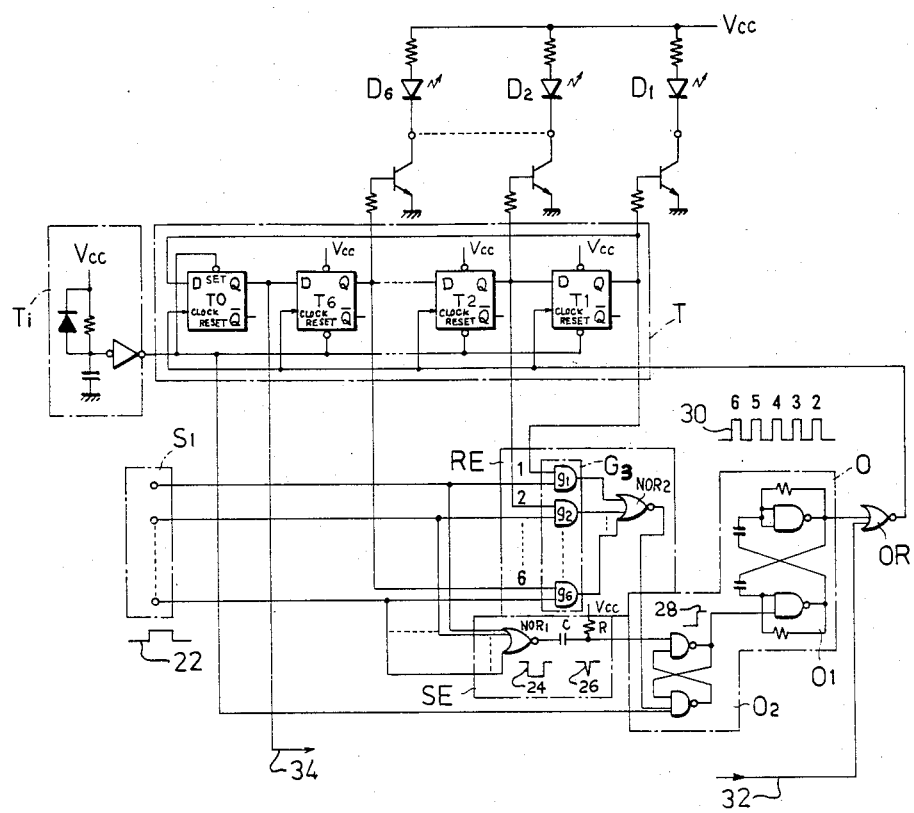
FIG. 2 is a circuit diagram of an example of the tape selection circuit according to the invention.

FIG. 2 shows an embodiment of the tape selection circuit $P_2$. In the drawing, symbol O denotes a piece number designation signal-generating circuit consisting of an oscillation circuit $O_1$ (e.g. non-stable multivibrator) and a control circuit $O_2$ (e.g. flip-flop circuit) of the oscillation circuit. SE in the figure, denotes a set circuit which renders the piece number designation signal-generating circuit O operative, upon manipulation of the preset switch group $S_1$. RE denotes a reset circuit which stops the set circuit after completion of a designation of a desired piece of music on the tape. A NOR circuit $NOR_1$ forming the set circuit SE is connected to each switch 1 to 6 of the preset switch group $S_1$ and applies its output to the piece number designation signal-generating circuit O via a differential circuit consisting of a resistor R and a capacitor C as the input to its oscillation control circuit $O_2$. Similarly, a NOR circuit $NOR_2$ forming the reset circuit RE is connected to each switch of the preset switch group 1 to 6 via a gate circuit $G_3$ and applies its output to the piece number designation signal-generating circuit O as the input to its oscillation control circuit $O_2$.

Reference symbol T denotes a shift register consisting of piece number designation circuits $T_1$ to $T_6$ (flip-flop circuits) and a piece selection end instruction circuit $T_o$ (flip-flop circuit). The output signal of the piece number designation signal-generating circuit O, that is to say, the output signal of the oscillation circuit $O_1$, and a piece interval signal 32 (a piece interval detection circuit will be explained elsewhere), are applied as inputs to each piece number designation circuit $T_1$ to $T_6$ and to the piece selection and instruction circuit $T_o$, via an OR circuit. The output of each piece number designation circuit $T_1$ to $T_6$ is connected so as to correspond to each AND circuit $g_1$ to $g_6$ of the gate circuit $G_3$.

Ti is an initial reset circuit of the piece selection end instruction circuit $T_o$ and applies a high signal only to the piece selection end instruction circuit $T_o$ and a low signal to each piece number designation circuit $T_1$ to $T_6$ when the power source is connected, or when connection is changed from the station selection circuit to the tape selection circuit. $D_1$ to $D_6$ represent light-emitting diodes for display in accordance with the designation of the piece number.

The operation of the tape selection or scanning circuit $P_2$, that is to say, the operation of the so-called "head indexing" circuit, is carried out in the following manner. It will now be assumed that the tape is at the second piece and it is desired to play the 7th piece. In this case, the preset switch 5 (the number of the piece interval) of the preset switch group $S_1$ is depressed and a fast-forward operation is then made, whereby the piece interval of five is calculated in accordance with the numeric figure and the head indexing of the seventh tape is made. If the first piece is to be played when the tape is now at the second piece, on the other hand, the preset switch 2 (the number of the piece interval) of the preset switch group $S_1$ is depressed and a rewinding operation is then made, whereby the head indexing of the first piece is established.

The above-mentioned operation will be explained in more detail with reference to the circuit shown in FIG. 2. If the preset switch 2 of the preset switch group $S_1$ is depressed, for example, a high signal 22 is produced and applied to the set circuit SE so that the signal is inversed to a low signal 24 by the NOR circuit $NOR_1$ of the set circuit SE. The fall of this signal 24 is differentiated into a trigger signal 26 by the capacitor G and the resistor R, thereby setting the oscillation control circuit $O_2$ of the piece number designation signal-generating circuit O. As a result, a high signal 28 is produced from the control circuit $O_2$, thereby starting an oscillation of the oscillation circuit $O_1$. A pulse signal 30 is thus produced by $O_1$ of the oscillation circuit O. The shift register circuit T is sequentially shifted in the sequence of $T_o \rightarrow T_6 \rightarrow T_5 \rightarrow T_4 \rightarrow T_3 \rightarrow T_2$, in accordance with every pulse of signal 30. When the shift reaches the piece number designation circuit $T_2$, the circuit $T_2$ produces a high signal, which is applied as the preset signal to the AND circuit $g_2$ of the gate circuit $G_3$. Since the high signal 22 is applied as one of the inputs to this AND circuit $g_2$ from the switch 2 of the preset switch group $S_1$, the output of this AND gate $g_2$ becomes a high signal due to the high signal of the preset switch 2 and the high signal from the above-mentioned piece number designation circuit $T_2$. This high signal is inverted to a low signal by the NOR circuit $NOR_2$ and this low signal resets the oscillation control circuit $O_2$ (flip-flop circuit), thus stopping the piece number designation signal-generating circuit O as a whole. As a result, the shift register T is set to the piece number designation circuit $T_2$.

When the fast-forward operation of the tape is carried out under the above-mentioned state, the piece interval signals 32 are produced along with travel of the tape and the piece number designation circuits of the shift register T are sequentially shifted from $T_2$, which is under the set state, in accordance with the piece interval signal. When the two piece interval signals 32 arrive, the register is shifted in the manner $T_2 T_1 t_o$ and is finally set to the piece selection end instruction circuit $T_o$. As a result, a piece selection end signal 34 is produced from the piece selection end instruction circuit $T_o$ and the apparatus is brought under the tape-play mode by means of this signal. In other words, the second piece counted from the present piece position of the tape (the position of the playback head) is now in the playback (reproduction) mode. For example, if the tape is now at the second piece, the fourth piece, which is ahead of the second piece by two piece interval, is placed in the play mode if the preset switch 2 is depressed. Similarly, if the shift register T is set to the piece number designation circuit $T_2$ by depressing the preset switch 2 and the tape rewinding operation is then made, the first piece, which is behind the second piece by the two piece interval, is brought under the play mode due to the above-mentioned operation.

Figure 3:
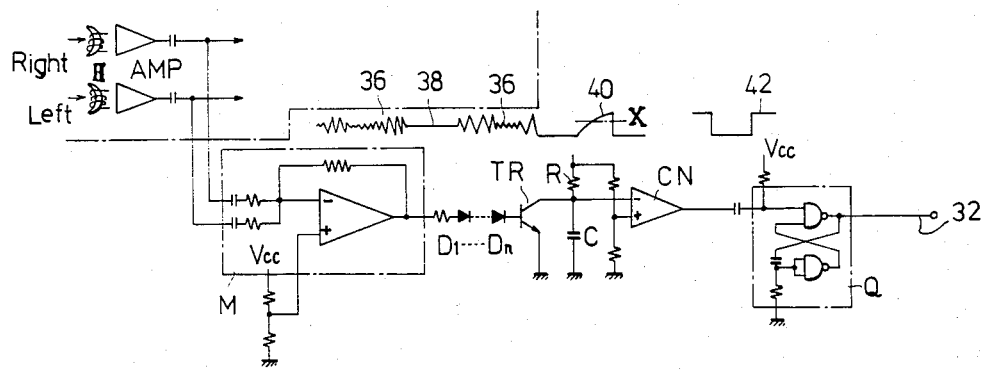
FIG. 3 is a circuit diagram of an example of a piece interval detection circuit according to the invention.

FIG. 3 shows an example of the piece interval detection circuit producing the piece interval signal 32 for shifting the above-mentioned shift register T to the piece selection end instruction circuit $T_o$. A music signal from a preamplifier AMP of the playback head H is mixed and amplified through a mixer/amplification circuit M thereby providing a music signal 36. A plurality of voltage level-setting diodes $D_1$, $D_2$ . . . are connected in series to the output side of the circuit M and a switching transistor TR is connected to the circuit M via these diodes. During the period in which the music signals 36 are present, this transistor TR repeatedly turns ON and OFF and during this period, the capacitor C connected to the collector of this transistor TE also repeatedly charges and discharges. As the tape player is operated (fast-forward and rewinding), non-recorded signals 38 are applied to the transistor TR, which drops below the operating level due to the diodes $D_1$, $D_2$ . . . $D_{12}$, and stops operating during this period. As a result, the capacitor C is charged via the resistor R and operates a comparator CN at a predetermined level x of a charge voltage 40, thus obtaining a signal as its output. This signal 42 is applied to the monostable multiple vibrator circuit Q, the circuit Q then detecting the fall of the signal 42 and producing an output of a pulse signal 32 set at a predetermined time. The pulse signal 32 is used as the aforementioned piece interval signal 32 shown in FIG. 2.

In this manner, the non-recorded portions between the pieces are sequentially detected, and as the piece interval signals 32 of a predetermined number appear, the shift register T is set to the piece selection and instruction circuit $T_o$, thus providing the piece selection end signal 34. In other words, the head indexing of the tape is completed and this signal 34 is used as a start signal for stopping the fast-forward or rewinding operation by the tape driving motor, thus bringing the apparatus to the play state.

In the tape player with a built-in radio illustrated above by way of example, which is equipped with the station selection circuit $P_1$ (the existing electronic tuner may be adapted) and the tape selection circuit $P_2$, the present invention provides a circuit device for selecting a desired station as well as a desired piece of music recorded on the tape which device comprises the preset switch group $S_1$ for selecting a desired station as well as a desired tape, and the station selection circuit/tape selection circuit change-over switch $S_2$ for changing over either one of the station selection circuit $P_1$ and the tape selection circuit $P_2$ and for controlling opening and closing of the gate circuit $G_1$ of the station selection circuit $P_1$ or the gate circuit $G_2$ of the tape selection circuit $P_2$, thereby keeping one of the station selection circuit $P_1$ and the tape selection circuit $P_2$ in the waiting state for operation and the other inoperative. Manipulation of each preset switch of the preset switch group renders the station selection circuit $P_1$ or tape selection circuit $P_2$ operative, since it is kept in the waiting state for operation. Thus, the present invention makes it possible to simplify the push button mechanisms for station selection and tape selection in a tape player with a built-in radio. The invention also simplifies the circuit configuration.

Since the push buttons of the existing station selection circuit can be used also as the push buttons to form the above-mentioned preset switches, a drastic change of the exiting mechanism is not necessary even when the tape selection circuit is to be added afresh. Hence, this arrangement perfectly eliminates the necessity for added space when providing both kinds of push buttons. Since the station selection circuit and the tape selection circuit, that are operated using the preset switches common to each other, are extremely simple in construction, a desired station and a desired tape music piece can be changed over easily and reliably. If the existing radio/tape selection switch is used for the above-mentioned change-over mechanism, automatic tape selection becomes feasible in the interlocking arrangement with loading of the cassette tape while station selection can be made automatically in the interlocking arrangement with ejection of the tape. Hence, a desired station and tape selection can be made reliably without erroneous operation by use of one system of preset switches. This arrangement also eliminates the complicated design and complicated operation required for the operator on a front panel unit, if the push buttons are independently provided on the front panel for station selection and for tape selection.

While specific embodiments of the invention have been shown and described in detail to illustrate the application of the principles of the invention, it will be understood that the invention may be embodied otherwise without departing from such principles.

What is claimed is:

1. In a car tape player with a built-in radio, the player having a front panel with controls for operation thereof, tape selection circuit means ($P_2$) for selecting a piece of music on a tape having a plurality of pieces of music, interlocking means for loading and ejecting a tape to and from the player, and station selection circuit means ($P_1$) for selecting a station of the built-in radio, comprising:

a single group of preset switches ($S_1$) in the front panel of the tape player for selecting a desired station as well as a desired piece of music on the tape, said switches being selectively connectable to said station selection circuit means or said tape selection circuit means;

station selection circuit/tape selection circuit changeover control switch means ($S_2$) connected to and switchable by the interlocking means, for selectively controlling changing over either one of said station selection circuit means and said tape selection circuit means, said changeover control switch means being associated with said station and tape selection circuit means and effective to cause changing over to said tape selection circuit means with a tape loaded in the interlocking means and to cause changing over to said station selection circuit means with a tape ejected from the interlocking means; and switching circuit means ($S_3$, $G_1$, $G_2$) connected to said station selection circuit means and said tape selection circuit means for rendering one of said tape and station selection circuit means inoperative while keeping the other of said tape and station selection circuit means in a waiting state for operation in response to a changeover operation of said changeover control switch means, said switching circuit means also being connected to said changeover control switch means and said group of preset switches, so that each preset switch of said group of preset switches is manipulatable to render operative that one of said tape and station selection circuit means which is in said waiting state.

2. The apparatus of claim 1, wherein said switching circuit means comprises a first plurality of NAND gates having outputs connected to said station selection circuit means, a second plurality of NAND gates having outputs connected to said tape selection circuit means, each NAND gate having two inputs, one input of one NAND gate of each of said first and second plurality of NAND gates connected respectively to one of said preset switches, and a level shifting circuit connected to the other input of each of said NAND gates, said changeover control switch means connectable to a voltage supply and having a tape/player output and a radio output, said level shifting circuit connected to at least one of said changeover control switch means outputs.

3. The apparatus of claim 2, wherein said level shifting circuit comprises a transistor having a base connected to said at least one of said changeover control switch means outputs and a collector connected to the other input of said NAND gates of one of said first and second plurality of NAND gates, and an inverter connected between said transistor collector and the other input of said NAND gates of the other of said first and second plurality of NAND gates.

4. The apparatus of claim 1, wherein said switching means includes a gate circuit.

* * * * *